US011956408B2

(12) United States Patent
Ogasawara

(10) Patent No.: US 11,956,408 B2
(45) Date of Patent: Apr. 9, 2024

(54) INFORMATION PROCESSING SYSTEM, INFORMATION PROCESSING METHOD, AND STORAGE MEDIUM

(71) Applicant: CANON KABUSHIKI KAISHA, Tokyo (JP)

(72) Inventor: Taku Ogasawara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/848,426

(22) Filed: Jun. 24, 2022

(65) Prior Publication Data
US 2022/0321856 A1 Oct. 6, 2022

Related U.S. Application Data

(63) Continuation of application No. 17/315,646, filed on May 10, 2021, now abandoned, which is a (Continued)

(30) Foreign Application Priority Data

Nov. 14, 2018 (JP) .................................. 2018-213769

(51) Int. Cl.
*H04N 13/117* (2018.01)
*G06T 1/20* (2006.01)
(Continued)

(52) U.S. Cl.
CPC ............. *H04N 13/117* (2018.05); *G06T 1/20* (2013.01); *G06T 3/0062* (2013.01);
(Continued)

(58) Field of Classification Search
CPC ....... G06T 1/20; G06T 3/0062; H04N 13/117; H04N 13/122; H04N 13/139; H04N 13/243
See application file for complete search history.

(56) References Cited

U.S. PATENT DOCUMENTS 5,729,471 A 3/1998 Jain
9,485,497 B2 * 11/2016 Karafin ................ H04N 13/261
11,244,423 B2 2/2022 Ogasawara
(Continued)

FOREIGN PATENT DOCUMENTS

CN 1713938 A 12/2005
CN 102598652 A 7/2012
(Continued)

OTHER PUBLICATIONS

Notification of Reason for Refusal issued by the Intellectual Property Office of Korea dated Apr. 22, 2022 in corresponding KR Patent Application No. 10-2021-7014249, with English translation.
(Continued)

*Primary Examiner* — Kee M Tung
*Assistant Examiner* — Jed-Justin Imperial
(74) *Attorney, Agent, or Firm* — Carter, DeLuca & Farrell LLP

(57) ABSTRACT

The information processing system obtains a plurality of images based on image capturing by a plurality of imaging devices; obtains viewpoint information for specifying a position of a virtual viewpoint and a view direction from the virtual viewpoint; and generates a plurality of virtual viewpoint contents each of which corresponds to one of a plurality of image formats based on the common plurality of obtained images and the obtained viewpoint information, and the plurality of image formats is image formats whose numbers of virtual viewpoints specified by the viewpoint information used for generation of the virtual viewpoint contents are different from one another.

14 Claims, 10 Drawing Sheets

Related U.S. Application Data continuation of application No. PCT/JP2019/043996, filed on Nov. 8, 2019.

(51) Int. Cl.
  *G06T 3/00* (2006.01)
  *H04N 13/122* (2018.01)
  *H04N 13/139* (2018.01)
  *H04N 13/243* (2018.01)

(52) U.S. Cl.
  CPC ......... *H04N 13/122* (2018.05); *H04N 13/139* (2018.05); *H04N 13/243* (2018.05)

(56) References Cited

U.S. PATENT DOCUMENTS

| | | | |
|---|---|---|---|
| 2007/0216782 | A1 | 9/2007 | Chernoff |
| 2011/0102596 | A1* | 5/2011 | Kotani ................. H04N 13/111 382/154 |
| 2011/0126160 | A1 | 5/2011 | Han |
| 2013/0278729 | A1 | 10/2013 | Choi |
| 2014/0025619 | A1* | 1/2014 | Michelstein .......... G06F 40/151 706/47 |
| 2014/0185749 | A1 | 7/2014 | Lee |
| 2017/0034449 | A1 | 2/2017 | Eum |
| 2018/0160049 | A1* | 6/2018 | Aizawa ................... H04N 23/69 |
| 2018/0288393 | A1* | 10/2018 | Yerli ...................... H04N 21/00 |
| 2020/0036955 | A1 | 1/2020 | Pesonen |
| 2021/0056662 | A1 | 2/2021 | Ogasawara |
| 2021/0235014 | A1 | 7/2021 | Ogasawara |

FOREIGN PATENT DOCUMENTS

| | | | |
|---|---|---|---|
| CN | 104519334 | A | 4/2015 |
| CN | 108141578 | A | 6/2018 |
| CN | 108418998 | A | 8/2018 |
| CN | 108510595 | A | 9/2018 |
| JP | 2006-352539 | A | 12/2006 |
| JP | 2014-215828 | A | 11/2014 |
| JP | 2017-069787 | A | 4/2017 |
| JP | 2018-166279 | A | 10/2018 |
| KR | 10-2013-0067855 | A | 6/2013 |
| KR | 10-2014-0021766 | A | 2/2014 |
| WO | 9631047 | A2 | 10/1996 |
| WO | WO-9631047 | A2 * | 10/1996 ............. G06T 15/10 |
| WO | 2017154606 | A1 | 9/2017 |
| WO | 2018/030206 | A1 | 2/2018 |

OTHER PUBLICATIONS

International Search Report issued in International Application No. PCT/JP2019/043996 dated Feb. 10, 2020, pp. 1-2, English Translation.

Extended European Search Report issued by the European Patent Office dated Jul. 13, 2022 in corresponding EP Patent Application No. 19884420.1.

Office Action issued by the Japanese Patent Office dated Sep. 27, 2022 in corresponding JP Patent Application No. 2018-213769, with English translation.

Written Decision on Registration issued by the Korean Patent Office dated Apr. 4, 2023 in corresponding KR Patent Application No. 10-2021-7014249, with English translation.

Notice of Reasons for Refusal issued by the Japan Patent Office dated Dec. 13, 2022 in corresponding JP Patent Application No. 2018-213769, with English translation.

Chinese Office Action issued in corresponding CN Patent Application No. 201980075013.6, dated Nov. 6, 2023, with English translation.

* cited by examiner

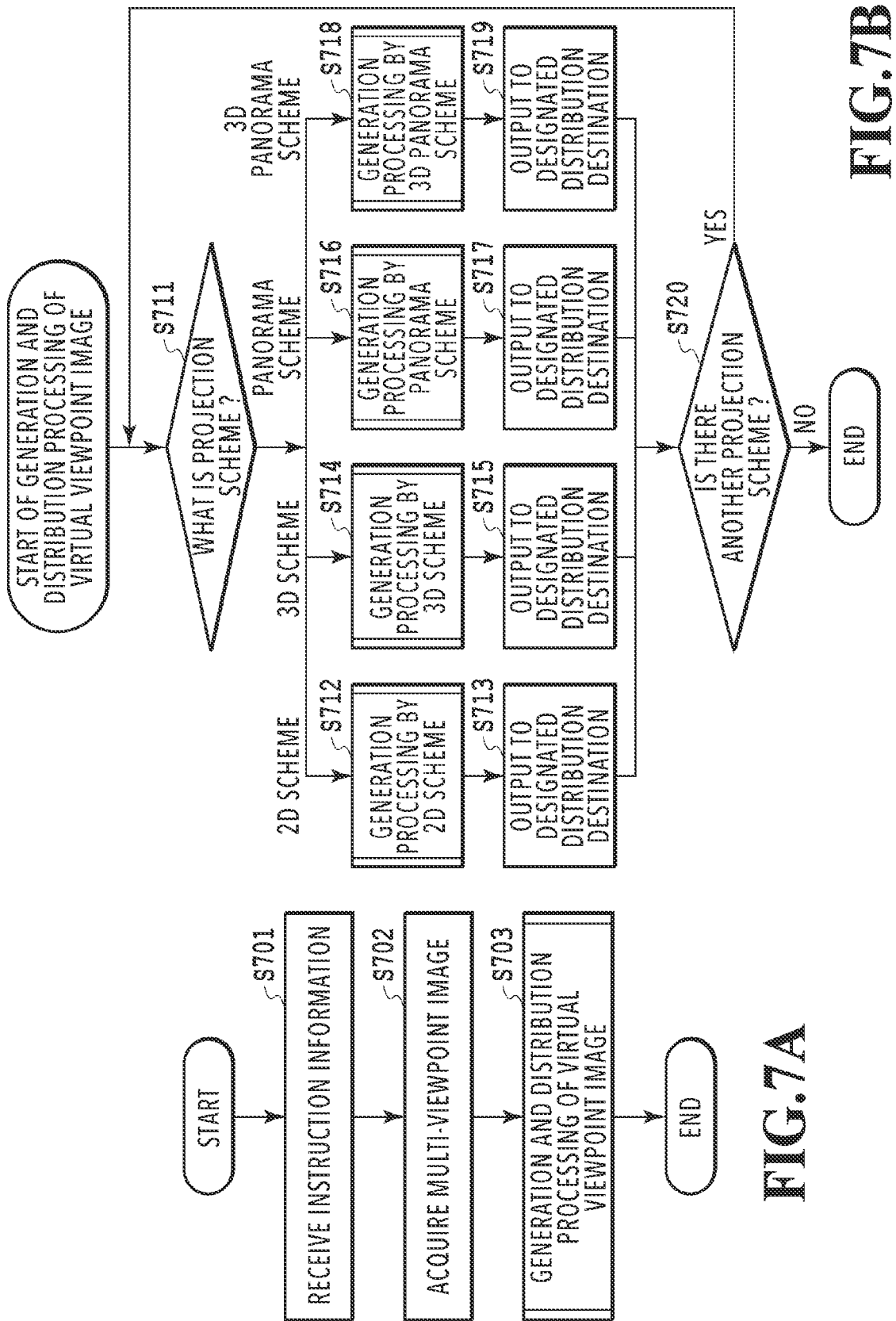

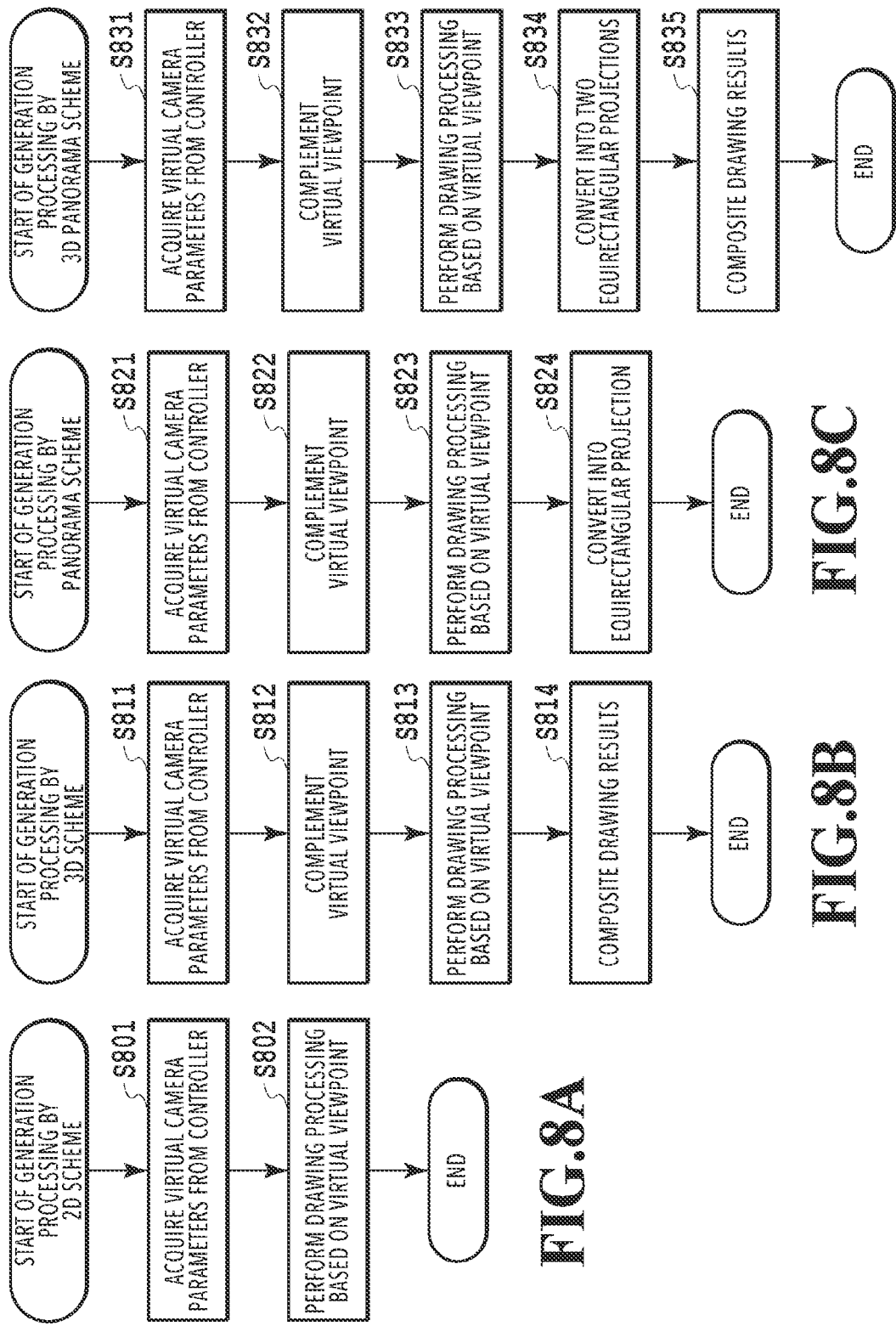

INFORMATION PROCESSING SYSTEM, INFORMATION PROCESSING METHOD, AND STORAGE MEDIUM

CROSS-REFERENCE TO RELATED APPLICATIONS

This application is a Continuation of U.S. patent application Ser. No. 17/315,646, filed May 10, 2021, which is a Continuation of International Patent Application No. PCT/JP2019/043996, filed Nov. 8, 2019, which claims the benefit of Japanese Patent Applications No. 2018-213769, filed Nov. 14, 2018, each of which are hereby incorporated by reference herein in their entirety.

BACKGROUND

Field

The present disclosure relates to generation and distribution of a virtual viewpoint image.

Background Art

As a technique to reproduce an image from a camera (virtual camera) that is arranged virtually within a three-dimensional space and which does not exist actually by using images captured with a plurality of real cameras, there is a virtual viewpoint image generation technique.

A virtual viewpoint image is characterized by allowing browsing a highlight scene or the like in sports, for example, such as soccer, from a variety of angles and being capable of giving a user a high feeling of being at a live performance compared to a normal image captured with a real camera. Japanese Patent Laid-Open No. 2014-215828 has described a technique to generate a plurality of virtual viewpoint images in accordance with virtual viewpoints designated by each of a plurality of users and share the plurality of virtual viewpoint images among the plurality of users.

SUMMARY

The plurality of virtual viewpoint images generated and distributed by the technique described in Japanese Patent Laid-Open No. 2014-215828 described above are all virtual viewpoint images in a common format (projection scheme) different in only the virtual viewpoint. However, in recent years, it is demanded to provide image contents in a variety of formats. For example, the format of an image at the time of distributing a captured image captured with a camera is not limited to a general two-dimensional scheme (in the following, described as "2D scheme") and there is a three-dimensional scheme (in the following, described as "3D scheme") that implements a stereoscopic view by using two images with disparity, In addition, there are a panorama scheme capable of changing the line-of-sight direction in the range of 360 degrees at the maximum, a 3D panorama scheme that implements a stereoscopic view by using two images obtained by the panorama scheme, and the like. In a case where it is possible to provide a user with image contents in a variety of formats as described above also for the virtual viewpoint image whose viewing point can be designated arbitrarily not only for the normal captured image, it is made possible for the user to experience a new viewing, and therefore, it is possible to improve the degree of satisfaction of the user.

Various embodiments of the present disclosure provide a user with virtual viewpoint contents in a plurality of different formats based on images obtained by performing image capturing with a plurality of imaging devices.

Means for Solving Problem

According to one embodiments of the present disclosure, the information processing system obtains a plurality of images based on image capturing by a plurality of imaging devices; obtains viewpoint information for specifying a position of a virtual viewpoint and a view direction from the virtual viewpoint; and generates a plurality of virtual viewpoint contents each of which corresponds to one of a plurality of image formats based on the common plurality of obtained images and the obtained viewpoint information, and the plurality of image formats is image formats whose numbers of virtual viewpoints specified by the viewpoint information used for generation of the virtual viewpoint contents are different from one another.

Further features of the present disclosure will become apparent from the following explanation of embodiments, which is given with reference to the attached drawings.

BRIEF DESCRIPTION OF THE DRAWINGS

FIG. 7A and FIG. 7B are flowcharts showing a flow of generation and distribution processing of a virtual viewpoint image;

FIG. 8A to FIG. 8D are each a flowchart showing a flow of virtual viewpoint image generation processing by each projection scheme;

DESCRIPTION OF THE EMBODIMENTS

In the following, embodiments of the present disclosure are explained with reference to the drawings. The embodiments that are explained indicate examples in a case where the present disclosure is performed specifically and not limited to these.

In the present embodiment, an aspect is explained in which a plurality of imaging devices (cameras) is arranged so as to surround an image capturing-target three-dimensional space and based on images obtained by performing image capturing with the plurality of cameras, a plurality of virtual viewpoint contents different in the image format is generated and distributed. The image format in the present embodiment is the image format that is used to provide a user with the virtual viewpoint contents and in the following, this is also described as the projection scheme. Further, the virtual viewpoint contents are image contents that change by an end user and/or an appointed operator or the like manipulating the position and the orientation of a camera corresponding to a virtual viewpoint (virtual camera) and also called a free-viewpoint image, an arbitrary viewpoint image and the like. In the following, the virtual viewpoint contents are also described as a virtual viewpoint image. The virtual viewpoint image may be a moving image or a still image and in the present embodiment, explanation is given by taking a case of a moving image as an example.

(System Configuration)

Figure 1:
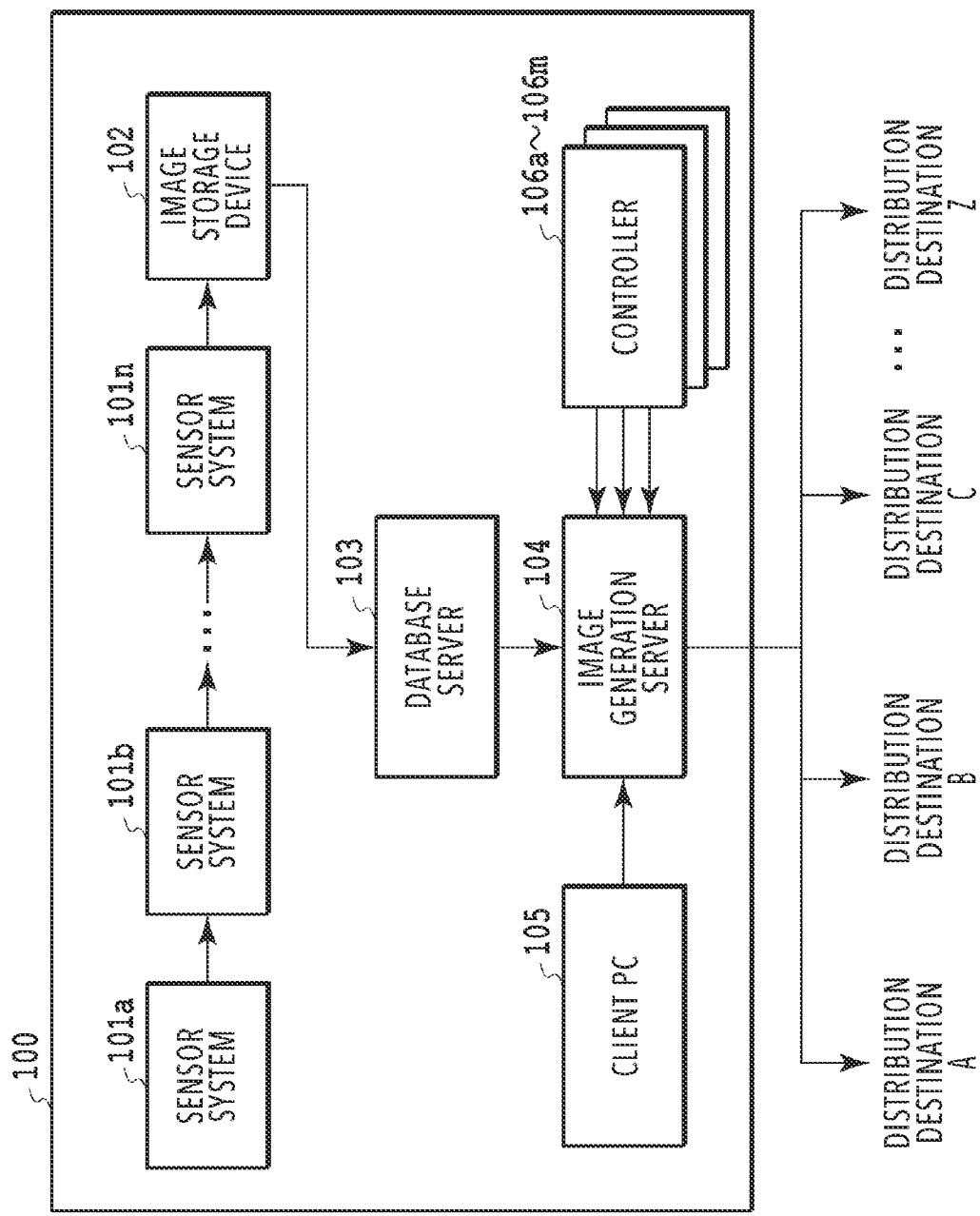
FIG. 1 is a diagram showing an example of a configuration of an image processing system that generates and distributes a virtual viewpoint image.

FIG. 1 is a diagram showing an example of the configuration of an image processing system that generates and distributes a virtual viewpoint image. An image processing system 100 includes sensor systems 101a to 101n, an image storage device 102, a database server 103, an image generation server 104, a client PC 105, and controllers 106a to 106m. In the following, each unit configuring the image processing system 100 is explained.

Figure 2:
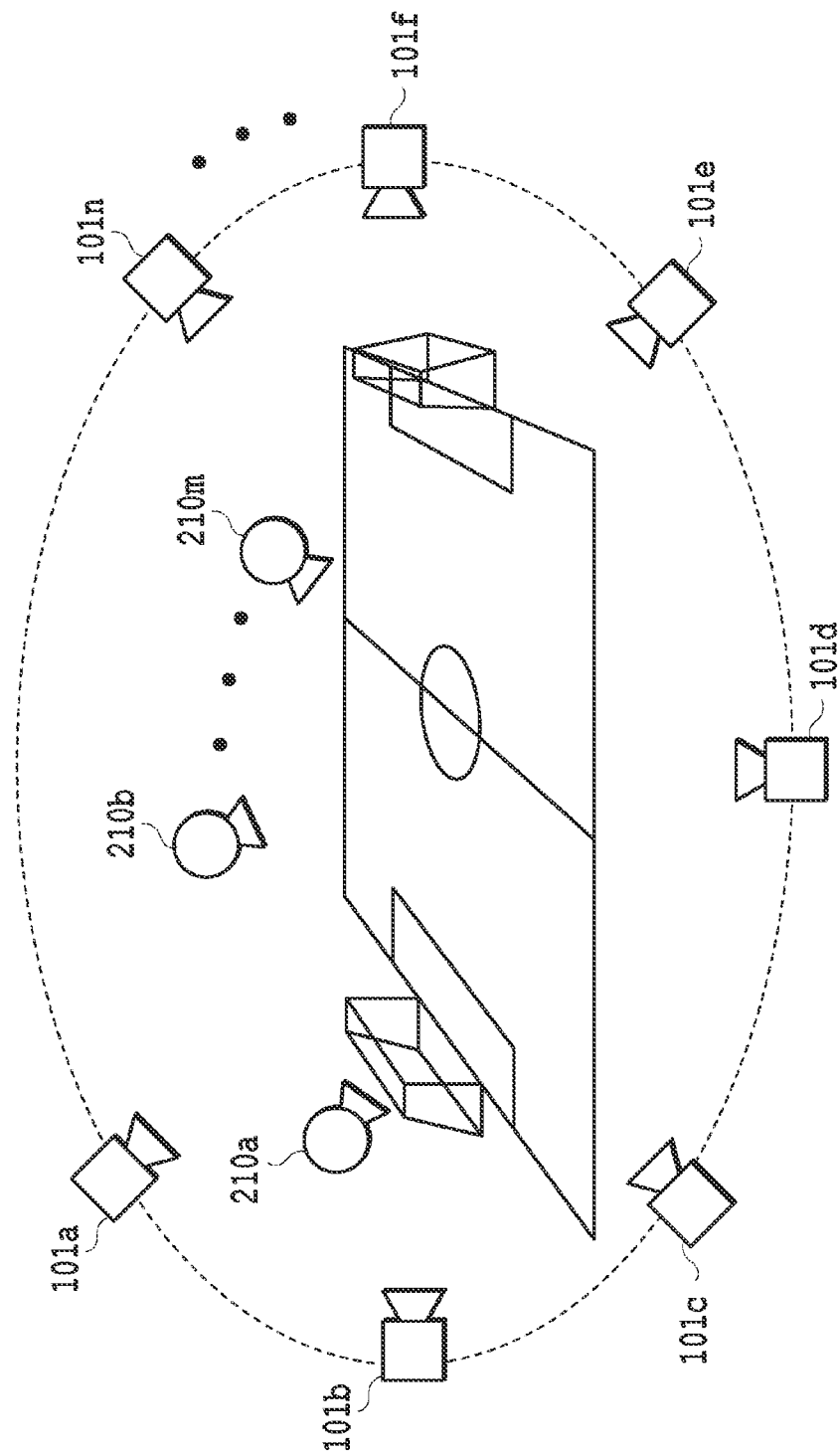
FIG. 2 is a diagram showing an installation example of a sensor system.

The sensor systems 101a to 101n are arranged so as to surround a three-dimensional space, which is an image capturing-target area such as a stadium. On sensor system has at least one camera. FIG. 2 shows an installation example of the sensor systems 101a to 101n. In the example in FIG. 2, a field within a stadium and players and a ball located thereon are taken as objects and the N sensor systems 101a to 101n are arranged so as to surround them. Each of the sensor systems 101a to 101n has a camera and a microphone (not shown schematically). Each camera of each of the sensor systems 101a to 101n captures the same object in synchronization. An aggregate of a plurality of images whose viewpoints are different, which is obtained by performing image capturing with each camera from directions different from one another is a multi-viewpoint image. Further, each microphone, not shown schematically, collects voice in synchronization. For simplification of explanation, description of voice is omitted, but basically, images and voice are processed together.

The image storage device 102 acquires a multi-viewpoint image, voice, and a time code that is attached at the time of image capturing from the sensor systems 101a to 101n and stores them in the database server 103. It may also be possible to perform image processing, for example, such as foreground/background separation processing, for the multi-viewpoint image and store it along with results thereof in the database server 103.

The controllers 106a to 106m are input devices for each user to operate virtual cameras 210a to 210m and for example, a joystick, tablet, head-mounted display (HMD), or the like is used. In accordance with a virtual viewpoint designated by a user using the controllers 106a to 106m, a virtual viewpoint image is generated in the image generation server 104. In the present embodiment, the configuration is such that a plurality of operators uses the plurality of the controllers 106a to 106m at the same time and sets different virtual viewpoints independently of one another. However, the configuration may be one in which, for example, it is possible to designate a plurality of different virtual viewpoints with one tablet. In the following explanation, in a case where an arbitrary one of the controllers 106a to 106m is described, this is described as "controller 106" and in a case where an arbitrary one of the virtual cameras 210a to 210m is described, this is described as "virtual camera 210".

The client PC 105 is an information processing apparatus for providing information necessary for an operator or the like to generate and distribute a virtual viewpoint image to the image generation server 104. An operator creates information (in the following, called "instruction information") designating the number of virtual viewpoint images to be generated, the projection scheme that is applied at the time of generation, the output destination (distribution destination) of the generated virtual viewpoint image, and the like by using a user interface, to be described later, and sends the instruction information to the image generation server 104.

The image generation server 104 generates virtual viewpoint images by a variety of projection schemes from the multi-viewpoint image acquired from the database server 103 in accordance with the instruction information that is sent from the client PC 105. At that time, the virtual viewpoints set by the controllers 106a to 106m are used. Then, the image generation server 104 outputs the one or more generated virtual viewpoint images to designated distribution destinations A to Z. As an example of the distribution destination, for example, there are a moving image sharing site, SNS, broadcasting center, public viewing and the like. Here, in a case of the moving image sharing site and SNS, both the live distribution scheme and the on-demand distribution scheme are compatible, and therefore, an operator designates the projection scheme in accordance with the distribution aspect. The live distribution is distribution to broadcast live real time and the on-demand distribution is distribution that enables a user to view accumulated data as needed. It is possible for a viewer to easily view the live distribution or the on-demand distribution by connecting to the moving image sharing site or SNS by using a smartphone or the like.

The above is the outline of each element configuring the image processing system 100. The above-described system configuration is an example and for example, it may also be possible to implement the client PC 105 and the image generation server 104 by one computer. Further, for example, the client PC 105 and the controller 106 may be configured into one unit.

(Configuration and Function of Image Generation Server)

Figure 3A:
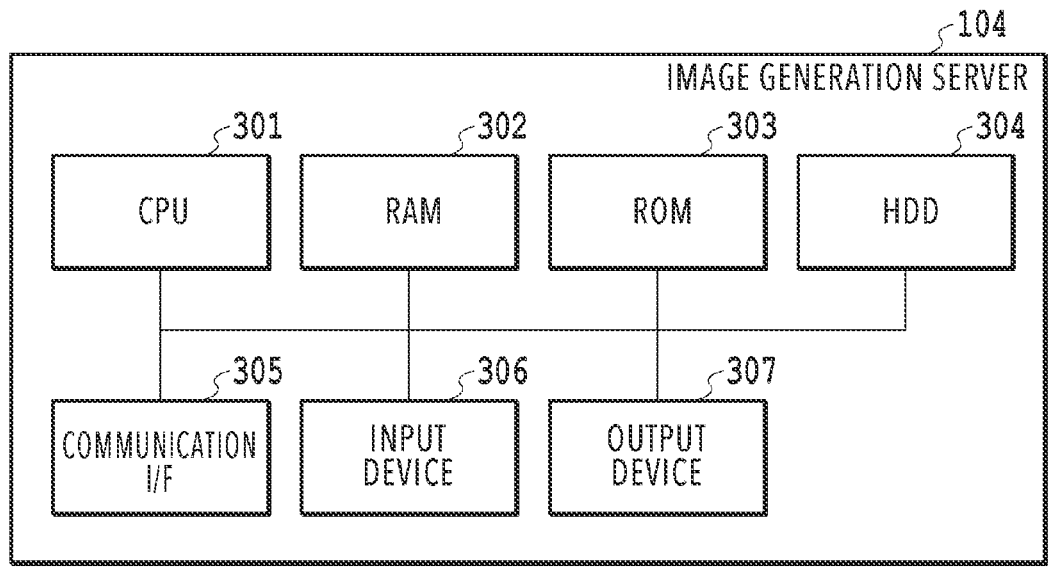
FIG. 3A is a diagram showing a hardware configuration of an image generation server and FIG. 3B is a diagram showing a software configuration thereof.
Figure 3B:
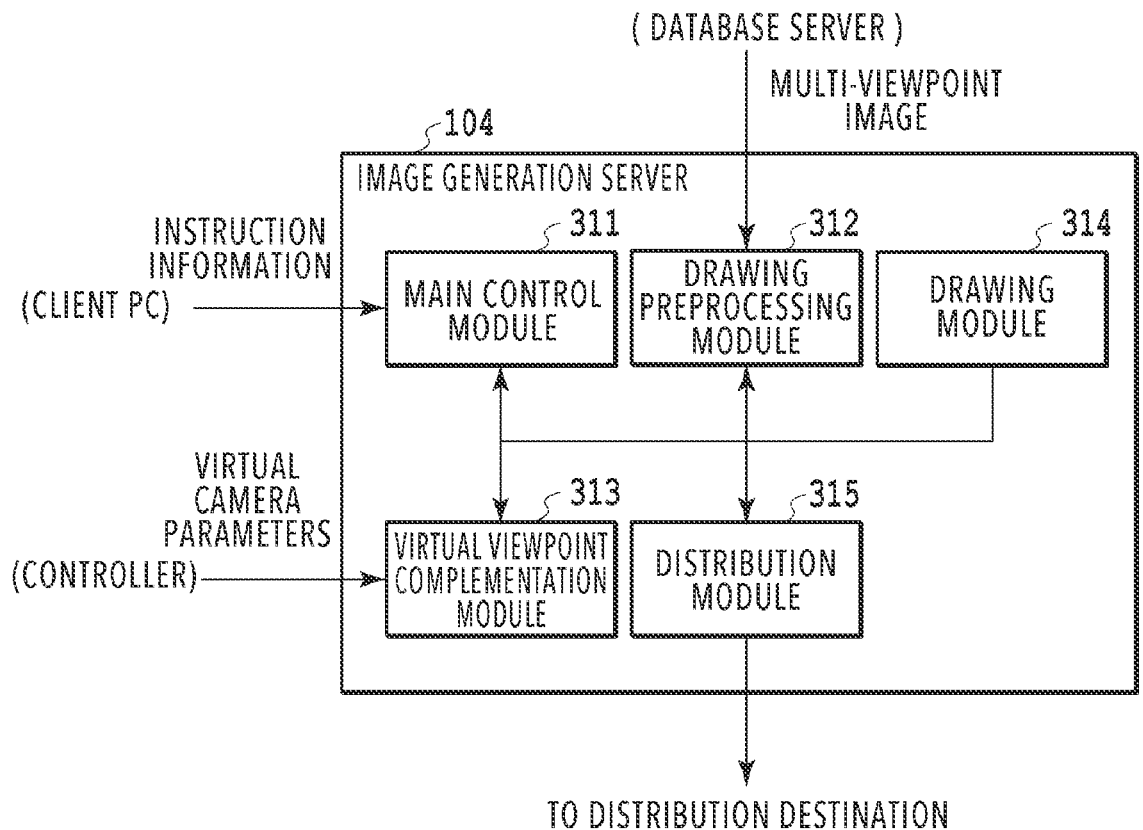

Following the above, the configuration and function of the image generation server 104 are explained in detail. FIG. 3A shows the hardware configuration of the image generation server 104 and the FIG. 3B shows the software configuration of the image generation server 104. First, the hardware configuration is explained and next, the software configuration is explained.

The image generation server 104 includes hardware that a general information processing apparatus has, that is, a CPU 301, a RAM 302, a ROM 303, an HDD 304, a communication I/F 305, an input device 306, and an output device 307. The CPU 301 is a processor that centralizedly controls each unit of the image generation server 104 by executing various programs stored in the ROM 303 by using the RAM 302 as a work memory. By the CPU 301 executing various programs, the function of each processing module shown in FIG. 3B is implemented. The RAM 302 temporarily stores programs read from the ROM 303, operation results and the like. The ROM 303 stores programs, such as an OS, that do not need to be changed and data. The HDD 304 is a large-capacity storage device that stores the multi-viewpoint image read from the database server 103, the generated virtual viewpoint image and the like and may be, for example, an SSD or the like. The communication I/F 305 is compatible with the communication standard, such as Ethernet and USB, and performs communication with the database server 103, the client PC 105, and the controllers 106a to 106m. The input device 306 is a keyboard or a mouse, for an operator to perform various input operations. The output device 307 is a display device, such as a monitor, that displays information (UI screen and the like) necessary for an operator. In a case where, for example, a touch panel device is adopted as the output device 307, the touch panel display functions also as the input device 306 described above. The above-described hardware configuration is also comprised by, for example, the client PC 105.

Following the above, with reference to FIG. 3B, the main software configuration of the image generation server 104 is explained. The image generation server 104 has five processing modules: a main control module 311, a drawing preprocessing module 312, a virtual viewpoint complementation module 313, a drawing module 314, and a distribution module 315. Explanation is given on the assumption that the image generation server 104 of the present embodiment generates virtual viewpoint images in accordance with one or more designated projection schemes among the four kinds of predetermined projection scheme, that is, the 2D scheme, the 3D scheme, the panorama scheme, and the 3D panorama scheme described previously. The projection schemes that can be designated are not limited to the above-described four kinds. As will be described later, the number of virtual viewpoints indicated by the viewpoint information that is used for the generation of virtual viewpoint images is different for different projection schemes.

The main control module 311 is a module that plays a main role at the time of generating a virtual viewpoint image in accordance with the instruction information described previously and gives various instructions to the other processing modules. For example, in a case where the 3D scheme is designated, only the virtual viewpoint that is set by the controller 106 is not enough, and therefore, the main control module 311 instructs the virtual viewpoint complementation module 313 to complement a virtual viewpoint that is lacking. Then, the main control module 311 instructs the drawing module 314 to perform drawing processing using the two virtual viewpoints (virtual viewpoint set by a user with the controller 106 and virtual viewpoint obtained by the above-described complementation). Then, the main control module 311 generates one virtual viewpoint image by the 3D scheme by performing composition processing for the drawing processing results (two images corresponding to the two virtual viewpoints) received from the drawing module 314. It is possible for the main control module 311 to generate and distribute a plurality of virtual viewpoint images by performing the series of processing such as this both simultaneously and in parallel in accordance with the number of virtual viewpoint images to be generated designated in the instruction information from the client PC 105.

The drawing preprocessing module 312 acquires a multi-viewpoint image from the database server 103 by designating the time code at the time of image capturing. This multi-viewpoint image is obtained by each camera of the sensor systems 101a to 101n performing synchronous image capturing and stored in the database server 103 by the image storage apparatus 102. Further, the drawing preprocessing module 312 also performs processing to generate data (three-dimensional model) indicting the three-dimensional shape of the foreground and the background, which is used in the drawing processing (rendering) in the drawing module 314, from the multi-viewpoint image. This three-dimensional model is generated by using a shape estimation method (for example, Visual Hull and the like) and configured by, for example, a point cloud. The configuration may be one in which the generation of the three-dimensional model is performed by another apparatus, for example, such as the image storage apparatus 102, and the drawing preprocessing module 312 acquires the three-dimensional model generated by another apparatus along with the multi-viewpoint image.

The virtual viewpoint complementation module 313 acquires the viewpoint information (in the following, also described as "virtual camera parameter") specifying the position and orientation of each of the virtual cameras 210a to 210m, which is output by each of the controllers 106a to 106m. This viewpoint information may include information on, for example, magnification (zoom), not only the positions and orientations of the virtual cameras 210a to 210m. The number of virtual viewpoints necessary for the generation of one virtual viewpoint image is different depending on the projection scheme thereof. For example, in a case where the designated projection scheme is the 2D scheme, one virtual viewpoint is enough. In contrast to this, in a case of the 3D scheme, one another virtual viewpoint is necessary, which forms a relationship of both-eye disparity with the virtual viewpoint specified in the viewpoint information acquired from the controller 106. Consequently, the virtual viewpoint complementation module 313 complements the number of necessary virtual viewpoints in accordance with the projection scheme designated in the instruction information based on the virtual viewpoint according to the viewpoint information that is input from the controller 106. In this manner, the viewpoint information on the virtual viewpoint that is lacking is generated. This complementation of the virtual viewpoint will be described later.

The drawing module 314 performs drawing by the perspective projection for the three-dimensional model of the foreground and the background based on one or a plurality of virtual viewpoints specified in the viewpoint information received from the virtual viewpoint complementation module 313. Specifically, the drawing module 314 performs processing to select a multi-viewpoint image to be used for each point configuring the three-dimensional model and acquires an appropriate pixel value in the selected multi-viewpoint image based on the virtual viewpoint and perform coloring. The drawing results are sent to the main control module 311.

The distribution module 315 transmits the virtual viewpoint image generated as described above to a designated distribution destination. The distribution destinations of the plurality of virtual viewpoint images in accordance with the plurality of projection schemes may be different from one another, or at least part of the distribution destinations may be the same. In a case of the present embodiment, as will be described later, it is also possible to output one virtual viewpoint image to a plurality of distribution destinations. In the present specification, there is a case where the virtual viewpoint image that is distributed by the image generation server 104 is represented as "stream" and the number of distributions as "number of streams".

As described above, the image generation server 104 of the present embodiment is characterized by generating one or a plurality of virtual viewpoint images from a common multi-viewpoint image by applying a variety of projection schemes and transmitting them to one or a plurality of distribution destinations (multi-stream output). According to the method such as this, it is possible to efficiently respond to requests of a variety of users. For example, in a case where an image of the 3D scheme and an image of the panorama scheme are provided by the conventional method using a normal captured image, which is not a virtual viewpoint image, the captured image that is necessary for each image is different. In order to provide an image of the 3D scheme, which is not of the panorama scheme, a captured image for the right eye and a captured image for the left eye are necessary, that is, two image whose image capturing positions are different by several centimeters and whose image capturing directions are substantially the same are necessary. On the other hand, in order to provide a panorama image of 360°, a large number of captured images whose image capturing directions are different from one another, or a super wide angle (fisheye) captured image is necessary. Consequently, in order to provide images in a plurality of different formats to a user, the time and effort for performing image capturing the number of times corresponding to the number of formats are necessary. In contrast to this, it is possible for the image generation server 104 of the present embodiment to generate and provide images in a variety of formats by acquiring in advance a common multi-viewpoint image that does not depend on the format of the image to be provided and using this. Further, it is possible to provide images in a variety of formats in accordance with a virtual viewpoint designated arbitrarily by a user, which cannot be implemented with normal captured images.

(Setting of Virtual Viewpoint)

Following the above, the virtual viewpoint that is set by an operator is explained by taking a case as an example where the game of soccer in a stadium is the image capturing scene. First, the coordinate system representing the three-dimensional space of the image capturing target is explained, which is the reference in a case where a virtual viewpoint is set.

Figure 4A:
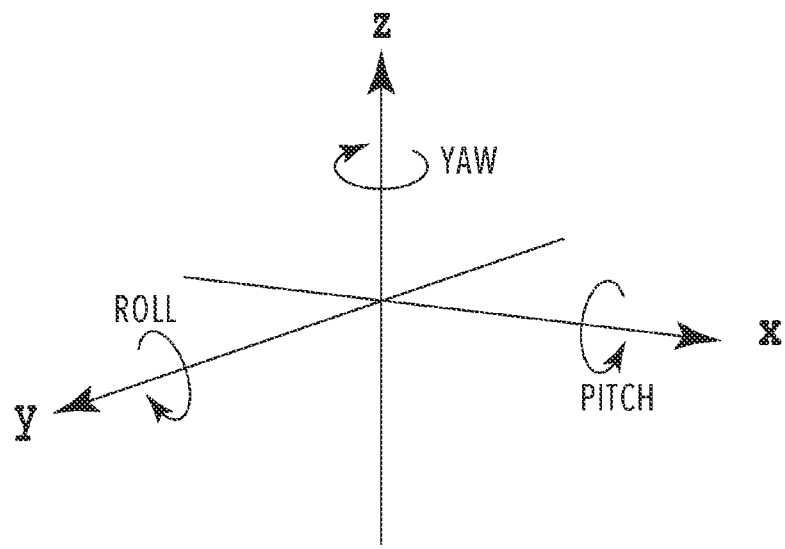
FIG. 4A is a diagram showing a coordinate system and FIG. 4B is a diagram showing objects on a field.
Figure 4B:
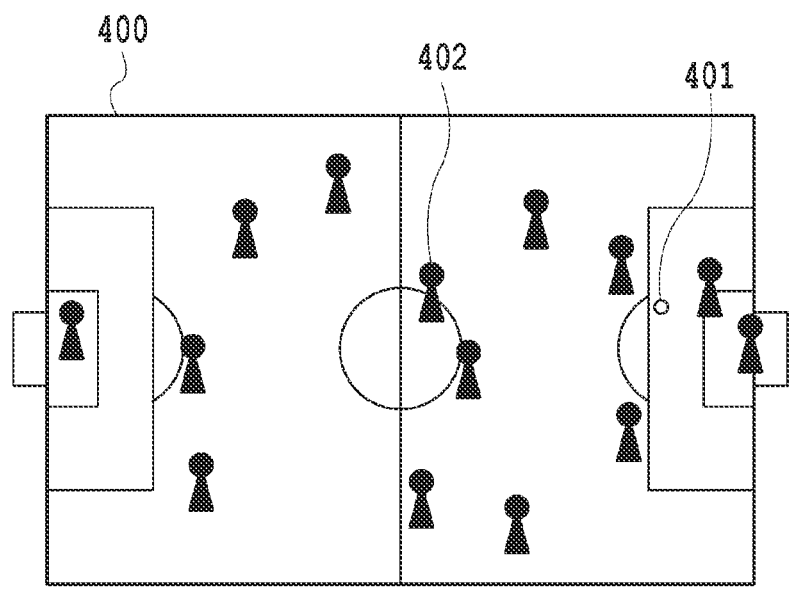

FIG. 4A shows a Cartesian coordinate system that represents a three-dimensional space by three axes, that is, X-axis, Y-axis, and Z-axis, which is used in the present embodiment. This Cartesian coordinate system is set to each object shown in FIG. 4B, that is, a field 400, a ball 401, a player 402 and the like existing thereon. Further, it may also be possible to set the Cartesian coordinate system to facilities within the stadium, such as an inspector stand and a signboard. Specifically, first, the origin (0, 0, 0) is set at the center of the filed 400. Then, the X-axis is set in the direction of the long side of the field 400, the Y-axis is set in the direction of the short side of the field 400, and the Z-axis is set in the direction vertical to the field 400. The direction of each axis is not limited to these. By using the coordinate system such as this, the position and orientation of the virtual camera 210 are designated.

Figure 5A:
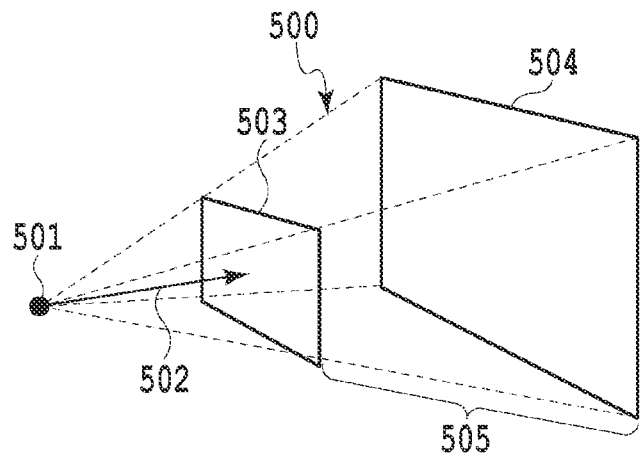
FIG. 5A to FIG. 5C are each a diagram explaining a virtual viewpoint.

In a quadrangular pyramid 500 shown in FIG. 5A, a vertex 501 indicates the position of the virtual camera 210 and a vector 502 in the line-of-sight direction, whose starting point is the vertex 501, indicates the orientation of the virtual camera 210. The position of the virtual camera is represented by components (x, y, z) of each axis and the orientation of the virtual camera 210 is represented by a unit vector whose component of each axis is taken as a scalar. It is assumed that the vector representing the orientation of the virtual camera 210 passes through the center points of a forward clip plane 503 and a backward clip plane 504. The view frustum of the virtual viewpoint, which is the projection range (drawing range) of a three-dimensional model, is a space 505 sandwiched by the forward clip plane 503 and the backward clip plane 504. Next, the movement of the virtual viewpoint (change in the position of the virtual camera 210) and the rotation of the virtual viewpoint (change in the orientation of the virtual camera 210) are explained.

Figure 5B:
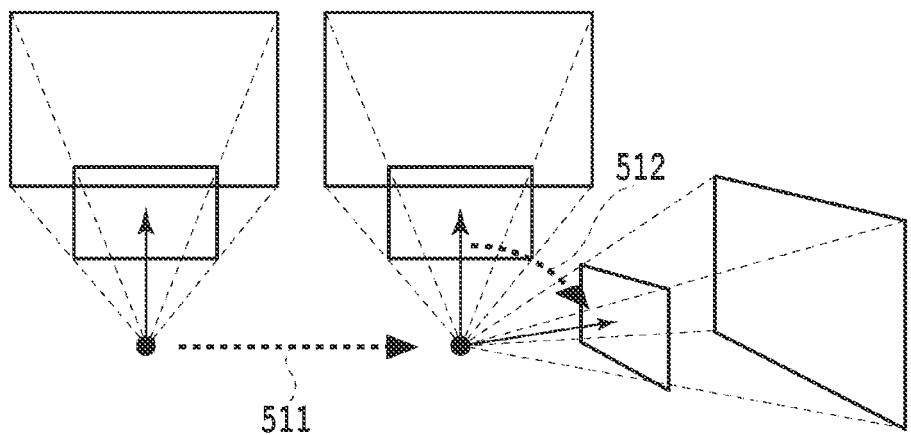

It is possible to move and rotate the virtual viewpoint within the space represented by three-dimensional coordinates. FIG. 5B is a diagram explaining the movement of the virtual viewpoint. In FIG. 5B, a broken-line arrow 511 indicates the movement of the virtual viewpoint and a broken-line arrow 512 indicates the rotation of the moved virtual viewpoint. The movement of the virtual viewpoint is represented by the components (x, y, z) of each axis and the rotation of the virtual viewpoint is represented by yaw that is the rotation about the Z-axis, pitch that is the rotation about the X-axis, and roll that is the rotation about the Y-axis. The movement and rotation of the virtual viewpoint such as these are used for complementation of the virtual viewpoint, to be explained next, in addition to the use for the manipulation of the virtual camera by the controllers 106a to 106m.

(Complementation of Virtual Viewpoint)

The complementation of the virtual viewpoint is processing to generate the virtual viewpoint that is lacking of the two or more virtual viewpoints necessary in a case where the projection scheme is the 3D scheme or the panorama scheme based on the virtual viewpoint set by the controller 106. Due to this, for example, in a case of the 3D scheme, two virtual viewpoints in the relationship of both-eye disparity are obtained. The virtual viewpoint that is obtained by this complementation is a virtual viewpoint different from any of the plurality of virtual viewpoints set by the plurality of the controllers 106a to 106m.

Figure 5C:
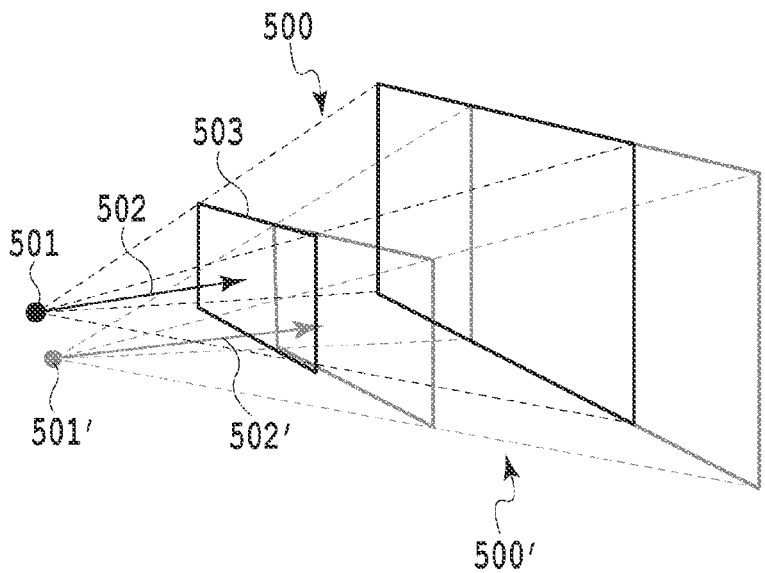

FIG. 5C is a diagram explaining the complementation of the virtual viewpoint in a case where the 3D scheme is designated. Here, it is assumed that virtual camera parameters that take the position of the virtual camera as the vertex 501 of the quadrangular pyramid 500 and the orientation thereof as the vector 502 are input to the virtual viewpoint complementation module 313. In a case of the 3D scheme, the movement and rotation described previously (change in the position and orientation of virtual viewpoint) are performed for the virtual viewpoint specified by the input virtual camera parameters and thereby another virtual viewpoint that establishes the relationship of both-eye disparity with the virtual viewpoint is generated. That is, a virtual viewpoint that takes the position of the virtual camera 210 as a vertex 501' of a quadrangular pyramid 500' and the orientation thereof as a vector 502' is newly generated. As regards the amount of movement and the amount of rotation at this time, it may also be possible for a user to designate appropriate values that implement the both-eye disparity via a UI screen, not shown schematically, or may apply predetermined values prepared in advance. Alternatively, it may also be possible to find in advance appropriate amounts of movement and amounts of rotation that implement the both-eye disparity at a plurality of positions (for example, positions shifted at predetermined intervals on each axis of X, Y, and Z) within the target three-dimensional space and prepare a LUT in which the plurality of positions and the amounts of movement and the amounts of rotation that are found are associated with each other, and then, determine the amount of movement and the amount of rotation corresponding to the position of the virtual viewpoint set by the controller 106 by interpolation processing with reference to the LUT. One virtual viewpoint image of the 3D scheme is obtained by performing drawing processing that takes, among the two virtual viewpoints thus obtained, the virtual viewpoint indicated by the quadrangular 500 as the virtual viewpoint for the left eye and the virtual viewpoint indicated by the quadrangular 500' as the virtual viewpoint for the right eye and arranging the images of the drawing results respectively, for example, side by side and composting them.

In this manner, the virtual viewpoint complementation module 313 complements the number of virtual viewpoints necessary in the designated projection scheme from the virtual viewpoint set by one of the controllers 106. The virtual viewpoint complementation method is different for each projection scheme. The complementation method in a case of the 3D scheme is as described above, but in a case of the panorama scheme, the number of virtual viewpoints necessary for covering the range of 360 degrees at the maximum with the virtual viewpoint set by the controller 106 being taken as a reference. For example, in a case where the number of virtual viewpoints necessary for covering the entire circumference of 360 degrees is six, the remaining five virtual viewpoints are complemented by moving and rotating the reference virtual viewpoint that is set by the controller 106 so that the drawing range of each virtual viewpoint is adjacent to one another. As the amount of movement and the amount of rotation at this time, it may also be possible for a user to designate appropriate values via a UI screen, not shown schematically, as in the case of the 3D scheme, or apply predetermined values prepared in advance. Further, it may also be possible to find an appropriate amount of movement and amount of rotation by using an LUT prepared in advance. Furthermore, it may also be possible to generate another virtual viewpoint by changing only the orientation without changing the position of the reference virtual viewpoint. By compositing the images corresponding to the six virtual viewpoints thus generated, respectively, a virtual viewpoint image of the panorama scheme is obtained. The 3D panorama scheme is the combination of the 3D scheme and the panorama scheme. That is, two images of the above-described panorama scheme are generated so that the both-eye disparity is obtained in order to implement a stereoscopic view based on the both-eye disparity of the panorama image. For example, in a case where six virtual viewpoints are used in order to cover the entire circumference of 360 degrees, a total of 12 (=6×2) virtual viewpoints are necessary. Consequently, the remaining 11 virtual viewpoints are complemented based on the virtual viewpoint set by the controller 106. At this time, it is sufficient to find the five virtual viewpoints of the 11 virtual viewpoints by the method of the panorama scheme so that the drawing range of each virtual viewpoint is adjacent to one another and find the remaining six virtual viewpoints by the method of the 3D scheme using the amount of movement and the amount of rotation appropriate for the both-eye disparity. By compositing the images corresponding to each of the 12 virtual viewpoints thus generated, a virtual viewpoint image of the 3D panorama scheme is obtained.

The reason it is possible to freely perform the complementation of the virtual viewpoint in accordance with each projection scheme as described above is that the multi-viewpoint image obtained by performing image capturing of an object from every direction with a plurality of cameras is obtained in advance. Even in a case where the object that spreads to a wide range, such as the field of the stadium, is the target, it is possible to complement another virtual viewpoint required by a designated projection scheme based on the information on the virtual camera that is set at an arbitrary position and with an arbitrary orientation within the target three-dimensional space. As described above, it is possible to obtain a virtual viewpoint that is lacking by the movement and/or the rotation of the reference virtual viewpoint, and therefore, for example, even in a case where the virtual viewpoint image of the panorama scheme is generated, it is not necessary to prepare the same number of controllers 106 as the number of virtual viewpoints necessary for that. In a case where a plurality of virtual viewpoint images in accordance with a plurality of projection schemes is generated, part of the virtual viewpoints used for the generation of each virtual viewpoint image may be common or the virtual viewpoints may be different from one another. For example, the virtual viewpoint image of the 3D scheme may be generated by taking the virtual viewpoint corresponding to the virtual viewpoint image of the 2D scheme as a reference and the virtual viewpoint corresponding to the virtual viewpoint image of the 2D scheme and the virtual viewpoint that is the reference of the virtual viewpoint image of the 3D scheme may be different.

(Projection Scheme and Designation of Distribution Destination)

Figure 6A:
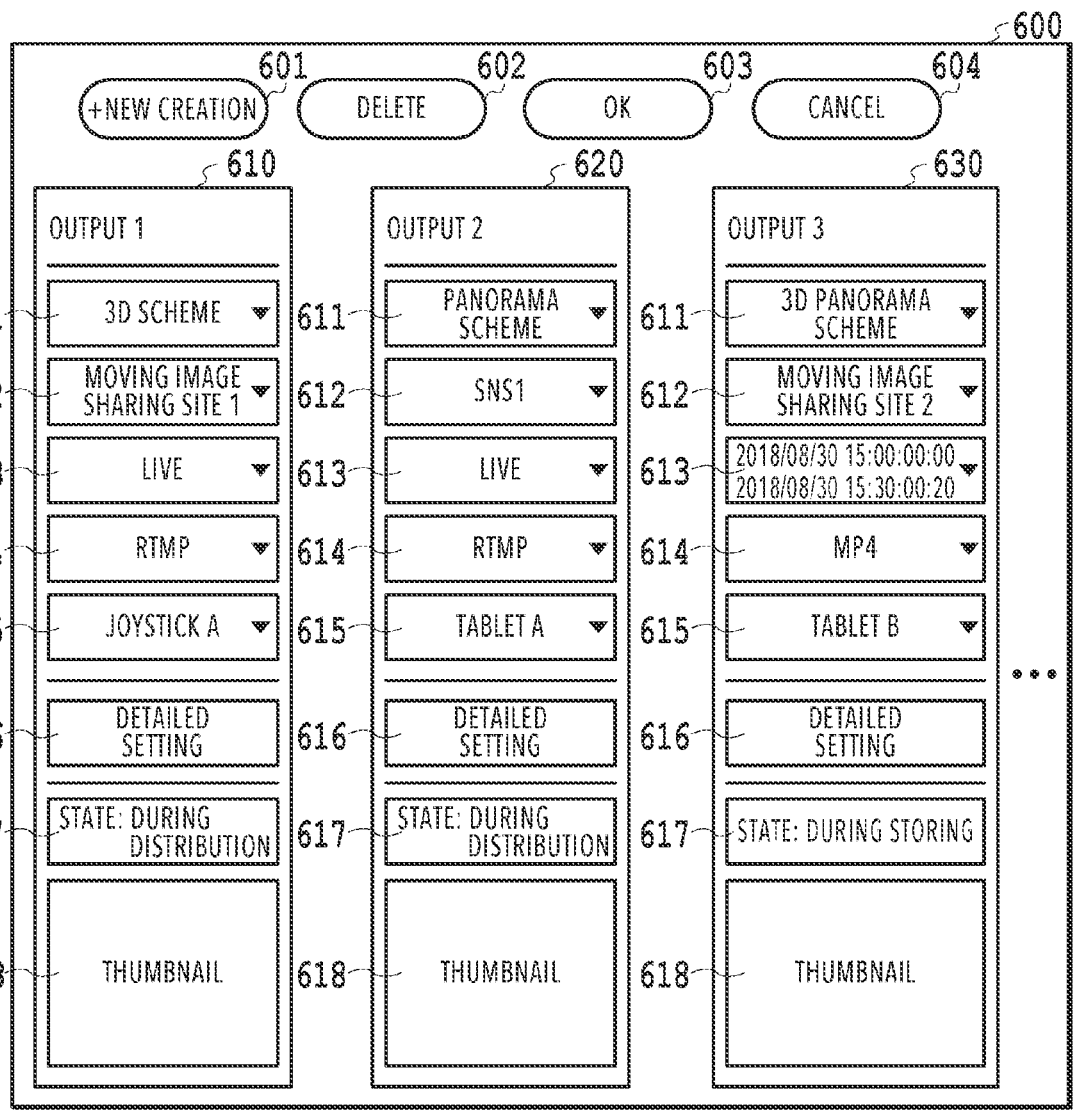
FIG. 6A and FIG. 6B are diagrams showing an example of a UI screen for giving instructions to generate and distribute a virtual viewpoint image.
Figure 6B:
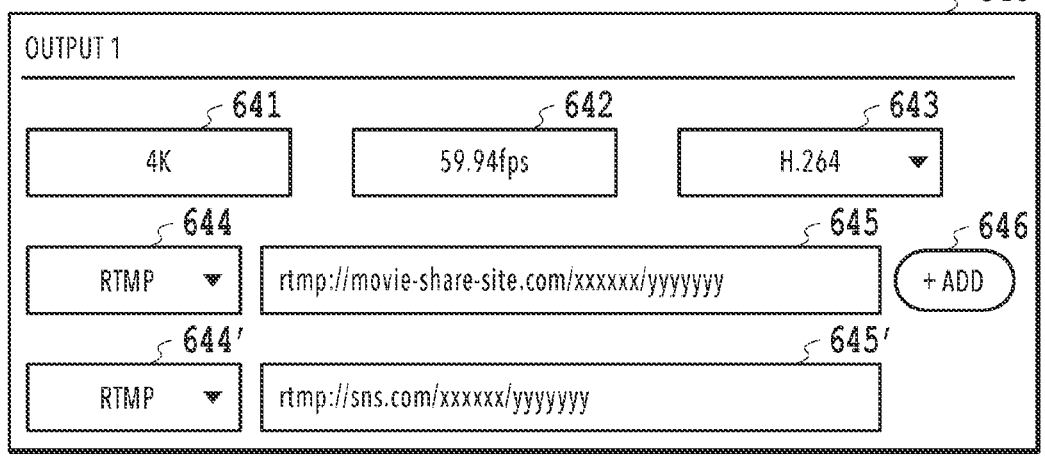

Next, a user interface (UI) for instructing the image generation server 104 to generate and distribute a virtual viewpoint image in the client PC 105 is explained. FIG. 6A and FIG. 6B are diagrams showing an example of a UI screen for a user to create instruction information by designating the projection scheme and the distribution destination, which is displayed on a monitor of the client PC 105, or the like. FIG. 6A shows a main screen 600 and FIG. 6B shows a sub-screen for detailed setting. First, the main screen 600 is explained.

<Main Screen>

First, an operator who is going to create instruction information presses down a New Creation button 601 on the main screen 600. Due to this, a setting list 610 for inputting information necessary for the generation and distribution of one virtual viewpoint image is displayed on the main screen 600. On the main screen 600 in FIG. 6A, three setting lists, that is, the setting list 610 and setting lists 620 and 630 are displayed and this means that the New Creation button 601 is pressed down three times. A Delete button 602 is used in a case where an arbitrary setting list is deleted, an OK button 603 is used in a case where the creation of a setting list is completed, and a Cancel button 604 is used in a case where the input operation of setting is aborted. Here, explanation is given by taking a case as an example where three virtual viewpoint images are generated by the projection schemes different from one another and those virtual viewpoint images are output to four different distribution destinations.

In a case where the setting of all the setting lists is completed and an operator presses down the OK button 603, the instruction information designating details of the generation and distribution of the virtual viewpoint images is transmitted to the image generation server 104. It may also be possible to display each setting list as a sub-screen separate from the main screen 600. Further, it may also be possible to provide the OK button 603 in each of the plurality of setting lists. In this case, it is possible to give instructions to generate and distribute the virtual viewpoint image for each setting list. In each of the setting lists 610 to 630, setting items 611 to 615 for designating main parameters necessary for the generation of each virtual viewpoint image, a detailed setting button 616, a state display field 617, and a thumbnail display field 618 exist, respectively. In the following, each element configuring the setting list is explained in order.

In the setting item 611, the projection scheme is designated. In the present embodiment, the four kinds of projection scheme of the 2D scheme, the 3D scheme, the panorama scheme, and the 3D panorama scheme are displayed in a pulldown menu and an operator selects one in the menu. Here, in the setting item 611 of the setting list 610, "3D scheme" is designated, in the setting item 611 of the setting list 620, "panorama scheme" is designated, and in the setting item 611 of the setting list 630, "3D panorama scheme" is designated.

In the setting item 612, the distribution destination is designated. As described previously, the distribution destination includes a moving image sharing site, SNS, TV station broadcast center, public viewing and the like. It may also be possible to configure the setting item 612 by displaying the contents of distribution destination candidates created in advance in a pulldown menu and causing an operator to select one of them, or configure the setting item 612 so that it is possible for an operator to directly input the distribution destination address, such as URL. Further, for example, the moving image sharing site is not limited to a specific one and it is possible to designate a plurality of different moving image sharing sites. Furthermore, even for the same moving image sharing site, it is also possible to designate different URLs or the like. At that time, the display is produced by using a name that can identify each site. Here, for convenience, it is made possible to identify each site by using names of "moving image sharing site 1" and "moving image sharing site 2". This is also the same with other distribution destinations, such as SNS and public viewing. Here, in the setting item 612 of the setting list 610, "moving image sharing site 1" is designated, in the setting item 612 of the setting list 620, "SNS 1" is designated, and in the setting item 612 of the setting list 630, "moving image sharing site 2" is designated.

In the setting item 613, the distribution format and the time code are designated. As described previously, to the multi-viewpoint image stored in the database server 103, the time code, which is time information at the time of image capturing, is attached. By making a request for a multi-viewpoint image to the database server 103 by designating the time code, it is possible to acquire the target data that can be identified uniquely. In the present embodiment, as the alternatives of the distribution format, the on-demand distribution and the live distribution are displayed in a pull-down menu and an operator selects one in the menu. Then, in a case of the on-demand distribution, the start time code and the end time code are further designated. Based on the user instructions such as these, the virtual viewpoint image for the on-demand distribution is generated by using the multi-viewpoint image that can be identified by the start time code and the end time code. The time code at this time is designated by the format, for example, such as "2018/08/30 15:00:00:00-2018/08/30 15:30:00:20", and includes year, month, day, time, frame number, and the like. The virtual viewpoint image that is generated in accordance with the time code and distributed on demand is used, for example, for replay reproduction of a highlight scene. On the other hand, in a case of the live distribution, from the image capturing with each camera up to the generation and distribution of the virtual viewpoint image are processed real time. Because of this, the method in which an operator designates the time code manually is not realistic. Consequently, in a case where the live distribution is selected, by selecting "Live" that is the character representation indicating the live distribution, the designation is completed and it is not necessary to designate the start and end time codes. In a case where the live distribution is designated, the image generation server 104 automatically designates the most recent time code immediately after being stored sequentially and acquires the multi-viewpoint image from the database server 103. In a case of the live distribution, the multi-viewpoint image obtained by image capturing with each camera is acquired sequentially and the virtual viewpoint image is generated real time and output sequentially to the designated distribution destination. It is also possible to add the on-demand distribution by a separate stream on the way of the live distribution.

In the setting item 614, the data format of the stream that is output from the image generation server 104, specifically, the kind of distribution protocol or the kind of video file format is specified. It is desirable to link the setting item 614 with the setting item 613 described above. That is, in a case where the live distribution is designated in the setting item 613 of each setting list, protocols for streaming, for example, such as RTMP (Real Time Message Protocol) and HLS (HTTP Live Streaming), are displayed as alternatives and an operator is caused to select therefrom. Further, in a case where the on-demand distribution is designated, video file formats, such as MP4, AVI, and MOV, are displayed as alternatives and an operator is caused to select therefrom. In the example in FIG. 6A, in the setting lists 610 and 620 in which the live distribution is designated, "RTMP" is designated and in the setting list 630 in which the on-demand distribution is designated, "MP4" is designated.

In the setting item 615, information (controller identification information) for designating the controller 106 having set the virtual viewpoint that is used to generate the multi-viewpoint image is designated. An operator selects one from the input devices, such as a joystick and a tablet, displayed as alternatives. To each of the controllers 106a to 106m, an identifier is attached and here, by designating the identifier, which controller is used for the generation of the multi-viewpoint image is designated. In the example in FIG. 6A, by attaching an alphabet letter to the kind name of the controller, such as "joystick A" and "tablet A", it is made possible to identify the controller. It is also possible to designate the same identifier for the generation of a plurality of virtual viewpoint images. Here, in the setting list 620, "table A" is designated and in the setting lest 630, "tablet B" is designated, respectively, but it is also possible to designate "tablet A" in both the setting lists 620 and 630. In this case, two virtual viewpoint images whose projection schemes are different are generated by using the virtual viewpoint set by "table A". The kind of controller is not limited by the projection scheme designated in the setting item 611 and it is also possible to designate different devices of the same model type.

The detailed setting button 616 is a button for displaying the sub-screen for detailed setting. The sub-screen for detailed setting will be described later.

In the state display field 617, a character string (for example, "during distribution", "completed", "error" and the like) indicating the processing state of the generation and distribution of the virtual viewpoint image is displayed. Here, "during distribution" indicates that the virtual viewpoint image is being output to the designated distribution destination, "completed" indicates that the generation and distribution processing is completed, and "error" indicates that an error has occurred during the generation and distribution. The contents of the state display are not limited to the three contents described above.

In the thumbnail display field 618, the thumbnail image of the virtual viewpoint image being processed is displayed. By viewing the thumbnail image, it is possible for an operator to intuitively grasp whether the contents designated in each setting item are as those intended or whether the processing is normal. At the time of an error, a sentence or the like indicating that an error has occurred is displayed.

The UI screen shown in FIG. 6A is merely an example and any UI screen may be used as long as it is possible to designate a desired projection scheme and designate the generation and the distribution destination of one or a plurality of virtual viewpoint images. For example, it may also be possible to configure the setting items 611 to 615 so that it is possible for an operator to directly input an arbitrary character string, a numerical value and the like in place of selecting one from among alternatives determined in advance.

<Sub-Screen>

Following the above, a sub-screen 640 for detailed setting shown in FIG. 6B is explained, which is displayed in a case where the detailed setting button 616 on the main screen 600 is pressed down. On the sub-screen 640, detailed information relating to the generation and distribution of a virtual viewpoint image is set.

In a setting field 641, the resolution of a virtual viewpoint image that is generated is designated. For example, it is possible to designate FHD (Full HD), 4K, 8K and the like and an operator selects one of these displayed as alternatives. In a setting field 642, the frame rate of a virtual viewpoint image that is generated is designated. For example, it is possible to designate 29.97 fps, 30 fps, 59.94 fps, 60 fps and the like and an operator selects one of these displayed as alternatives. In a setting field 643, the encode method for a virtual viewpoint image that is output is designated. For example, it is possible to designate H.264, H.265, HEVC and the like and an operator selects one of these displayed as alternatives. It may also be possible to configure the setting fields 641 to 643 so that an operator can input an arbitrary numerical value directly in place of designating one of alternatives.

In a setting field 644, the contents designated in the setting item 614 (output data format) on the main screen 600 described previously are set. For example, in a case where "RTMP" is set in the setting item 614, "RTMP" is also set in the setting field 644. Then, in an adjacent input field 645, the URL of the RTMP server, which is the output destination thereof, is input. Further, in a case where "MP4" is set in the setting item 614 on the main screen, "MP4" is also set in the setting field 644. Then, in the adjacent input field 645, the path, API or the like of the file server, which is the output destination thereof, is input. By further pressing down an Add button 646 located adjacent to the input field 645, it is made possible to add the distribution destination. Due to this, it is made possible to output one virtual viewpoint image that is generated in accordance with the setting list to a plurality of different distribution destinations. In the example in FIG. 6B, the Add button 646 is pressed down once and in a setting field 644' relating to another distribution destination, "RTMP" is input and in an input field 645' thereof, the URL thereof is input. The setting field 644 on the sub-screen 640 and the setting item 614 on the main screen 600 are linked and in a case where the contents of the setting field 644 are changed, the contents of the setting item 614 are also changed accordingly. Further, it is not necessary to make the same the output data format of the distribution destination that is added and for example, it is also possible to designate "HLS" in place "RTMP". The detailed setting item is not limited to that described above as long as the parameter is a parameter for generating a virtual viewpoint image.

By the UI screen as explained above, an operator creates the above-described instruction information by designating various items relating to the generation and distribution of a virtual viewpoint image and transmits the instruction information to the image generation server 104. Then, in the example in FIG. 6A, a total of three virtual viewpoint images are generated based on the virtual viewpoints from the different controllers 106 in the different projection schemes, respectively, and output to the different distribution destinations, respectively. In addition to this, it is also possible to generate a plurality of virtual viewpoint images using the same projection scheme but using the different controller 106 that sets the virtual viewpoint. At this time, it is sufficient to designate the common projection scheme in the setting item 611 of each setting list and designate the identifier of the different controller 106 in the setting item 615. In the example in FIG. 6A, the live distribution and the on-demand distribution are combined, but it is also possible to distribute all the streams live. Further, it is also possible to archive the virtual viewpoint image generated with the same setting contents during the live distribution and set the virtual viewpoint image so as to be output as the on-demand distribution during the live distribution or after the live distribution is completed.

(Generation and Distribution Processing of Virtual Viewpoint Image)

Following the above, the generation processing of a virtual viewpoint image and the distribution processing of the generated virtual viewpoint image in the image generation server 104 are explained. FIG. 7A is a flowchart showing a rough flow of the generation and distribution processing of a virtual viewpoint image. The series of processing is implemented by the CPU 301 executing a predetermined program to operate each processing module shown in FIG. 3B.

At S701, the main control module 311 receives the instruction information created for each setting list described previously from the client PC 105. At S702 that follows, the main control module 311 instructs the drawing preprocessing module 312 to acquire a multi-viewpoint image based on the received instruction information. At this time, the drawing preprocessing module 312 is instructed to acquire the multi-viewpoint image corresponding to the time code designated in each setting list. The drawing preprocessing module 312 having received the instructions acquires the multi-viewpoint image from the database server 103 by designating the time code based on the contents of the setting item 613 within the setting list. Then, at S703, each processing module operates under the control of the main control module 311 and generates the virtual viewpoint images corresponding in number to the designated number in accordance with the instruction information and outputs the virtual viewpoint images to the designated distribution destination. At this time, as a plurality of virtual viewpoint images whose projection schemes are different, it is possible to generate a plurality of virtual viewpoint images corresponding to the common time code. In a case where the instruction information includes a plurality of setting lists, the series of processing based on each setting list may be performed in parallel or sequentially. Details of the generation and distribution of a virtual viewpoint image at this step are explained with reference to another flow shown in FIG. 7B. In the present embodiment, a moving image is premised, and therefore, the flow shown in FIG. 7B is performed for each frame.

At S711, the main control module 311 specifies the projection scheme designated in the processing-target setting list and determines the step to which the processing advances next. Specifically, in a case where the 2D scheme is designated, the processing advance to S712, in a case where the 3D scheme is designated, the processing advances to S714, in a case where the panorama scheme is designated, the processing advances to S716, and in a case where the 3D panorama scheme is designated, the processing advances to S718, respectively.

Then, at S712, the processing to generate a virtual viewpoint image of the 2D scheme is performed. Then, at S713 that follows, the generated virtual viewpoint image of the 2D scheme is output to the distribution destination designated in the setting list. Similarly, at S714, the processing to generate a virtual viewpoint image of the 3D scheme is performed and at S715, the virtual viewpoint image of the 3D scheme is output to the distribution destination designated in the setting list. Similarly, at S716, the processing to generate a virtual viewpoint image of the panorama scheme is performed and at S717, the virtual viewpoint image of the panorama scheme is output to the distribution destination designated in the setting list. Similarly, at S718, the processing to generate a virtual viewpoint image of the 3D panorama scheme is performed and at S719, the virtual viewpoint image of the 3D panorama scheme is output to the distribution destination designated in the setting list. The generation of the virtual viewpoint image in accordance with each projection scheme at S712, S714, S716, and S718 is explained with reference to another flow shown in FIG. 8A to FIG. 8D.

(Generation of Virtual Viewpoint Image by Each Projection Scheme)

<2D Scheme>

First, a case of the 2D scheme is explained. FIG. 8A is a flowchart showing details of virtual viewpoint image generation by the 2D scheme.

Figure 9A:
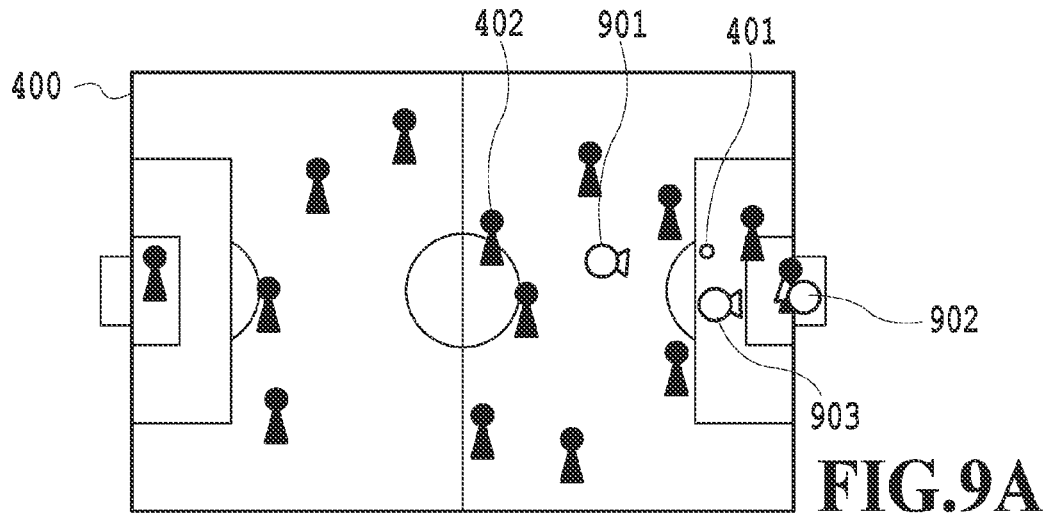
FIG. 9A is a diagram explaining positions of virtual cameras and FIG. 9B to FIG. 9E are each a diagram showing an example of a virtual viewpoint image.

At S801, the virtual viewpoint complementation module 313 acquires virtual camera parameters from the controller 106 corresponding to the identifier designated in the setting list. In the virtual camera parameters, at least information specifying the position and orientation of the virtual camera is included. FIG. 9A shows an example of the virtual viewpoint that is set by taking a shot scene as a target. Here, it is assumed that the virtual camera 210 is set at the position facing in the direction of the ball 401 from the outside of the penalty area as indicated by a mark 901 in the diagram shown in FIG. 4B described previously and the virtual camera parameters corresponding to the mark 901 are acquired. It is also assumed that each position of the virtual viewpoint on the Z-axis, which is set in the diagram shown in FIG. 9A, is fixed at the height of the line-of-sight of the player.

Figure 9B:
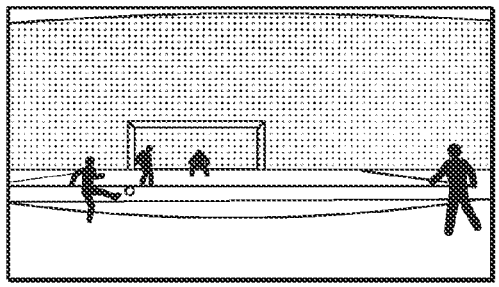

At S802, the drawing module 314 performs drawing processing by the perspective projection from the virtual viewpoint indicated by the virtual camera parameters acquired at S801 by using the three-dimensional model of the foreground and the background provided from the drawing preprocessing module 312. In a case of the 2D scheme, the composition processing and the conversion processing are not necessary for the drawing results, and therefore, the drawing results are output as the virtual viewpoint image for distribution as they are. FIG. 9B shows the virtual viewpoint image of the 2D scheme corresponding to the virtual viewpoint at the mark 901 described above. In this case, the virtual viewpoint image from the line-of-sight of the player located outside the penalty area is obtained.

<3D Scheme>

Next, a case of the 3D scheme is explained. FIG. 8B is a flowchart showing details of virtual viewpoint image generation by the 3D scheme. In the 3D scheme, two image in a relationship of both-eye disparity are generated, and therefore, two virtual viewpoints are used.

At S811, as at S801, the virtual viewpoint complementation module 313 acquires virtual camera parameters from the controller 106 corresponding to the identifier designated in the setting list. Here, it is assumed that the virtual camera 210 facing in the direction of the ball 401 from the position at which the goal keeper is located is set as indicated by a mark 902 in FIG. 9A described above and the virtual camera parameters corresponding to the mark 902 are acquired.

At S812, the virtual viewpoint complementation module 313 complements one another virtual viewpoint for implementing both-eye disparity based on the virtual camera parameters acquired at S811. The complementation method at this time is as already explained.

At S813, the drawing module 314 performs drawing processing by the perspective projection for the virtual viewpoint acquired at S811 and the virtual viewpoint complemented at S812, respectively, by using the three-dimensional model of the foreground and the background provided from the drawing preprocessing module 312.

Figure 9C:
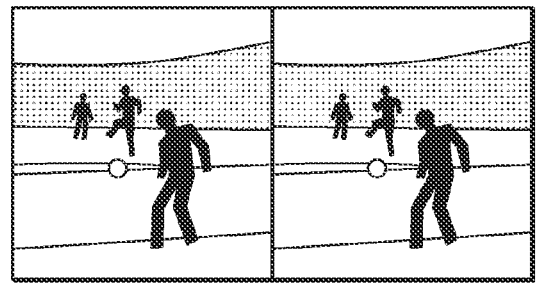

At S814, the main control module 311 performs composition processing by arranging the drawing results at S813 (two images corresponding to the two virtual viewpoints with disparity) side by side and generates one virtual viewpoint image of the 3D scheme. The format in which two images with both-eye disparity are arranged side by side is called the side by side format. The virtual viewpoint image of the 3D scheme thus obtained is distributed. FIG. 9C shows the virtual viewpoint image of the 3D scheme corresponding to the virtual viewpoint of the mark 902 described above. In this case, the virtual viewpoint image is an image in a case of being viewed from the same line-of-sight as that of the goal keeper. It is possible for a user to view the virtual viewpoint image stereoscopically by mounting a headset using a smartphone compatible with 3D display or a head-mounted display. In the example in FIG. 9C, it is possible for a user to experience a powerful scene in which the shot ball is just in front of his/her eyes with a feeling as if a user were the goal keeper.

<Panorama Scheme>

Next, a case of the panorama scheme is explained. FIG. 8C is a flowchart showing details of virtual viewpoint image generation by the panorama scheme. As described previously, in the panorama scheme, in order to cover the entire circumference of 360 degrees at the maximum, and therefore, more virtual viewpoints than those of the 3D scheme are used.

At S821, as at S801, the virtual viewpoint complementation module 313 acquires virtual camera parameters from the controller 106 corresponding to the identifier designated in the setting list. Here, it is assumed that the virtual camera 210 is set at the position facing in the direction of the ball 401 within the penalty area as indicated by a mark 903 in FIG. 9A described above and the virtual camera parameters corresponding to the mark 903 are acquired.

At S822, the virtual viewpoint complementation module 313 complements the number of virtual viewpoints necessary for the generation of images of the entire circumference by the panorama scheme based on the virtual camera parameters acquired at S821. The complementation method at this time is as already explained. In a case where the number of virtual viewpoints to be complemented is small, a panorama image in the range narrower than the entire circumference by an amount corresponding thereto is generated as a result.

At S823, the drawing module 314 performs drawing processing by the perspective projection for each of the virtual viewpoint acquired at S821 and one or more virtual viewpoints complemented at S822 by using the three-dimensional model of the foreground and the background provided from the drawing preprocessing module 312.

Figure 9D:
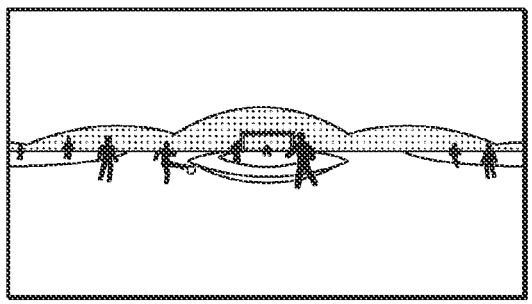

At S824, the main control module 311 performs conversion processing for the drawing results at S823 (a plurality of images corresponding to a plurality of virtual viewpoints) into the equirectangular projection and generates one virtual viewpoint image of the panorama scheme. The virtual viewpoint image of the panorama scheme thus obtained is distributed. FIG. 9D shows the virtual viewpoint image of the panorama scheme corresponding to the virtual camera 210 at the mark 903 described above. In this case, the virtual viewpoint image is an image of the entire circumference of 360 degrees with the position 903 within the penalty area being taken as a center. It is possible for a user to view a scene in the direction the user desires to view in the entire circumference of 360 degrees with the virtual viewpoint position set by the controller 106 being taken as a center by using a smartphone or the like compatible with the panorama image display.

<3D Panorama Scheme>

Next, a case of the 3D panorama scheme is explained. FIG. 8D is a flowchart showing details of virtual viewpoint image generation by the 3D panorama scheme. In the 3D panorama scheme, in order to cover the entire circumference of 360 degrees and implement both-eye disparity, the number of virtual viewpoints double that of the panorama scheme is used.

At S831, as at S801, the virtual viewpoint complementation module 313 acquires virtual camera parameters from the controller 106 corresponding to the identifier designated in the setting list. Here, as in the case of the panorama scheme described previously. it is assumed that the virtual camera 210 is set at the position indicated by the mark 903 (see FIG. 9A) and the virtual camera parameters corresponding to the mark 903 are acquired.

At S832, the virtual viewpoint complementation module 313 complements the number of virtual viewpoints necessary to cover the entire circumference by the 3D panorama scheme and for the generation of the image with both-eye disparity based on the virtual camera parameters acquired at S831. The complementation method at this time is as already explained.

At S833, the drawing module 314 performs drawing processing by the perspective projection for the virtual viewpoint acquired at S831 and each of the plurality of virtual viewpoints complemented at S832 by using the three-dimensional model of the foreground and the background provided from the drawing preprocessing module 312.

At S834, the main control module 311 divides the drawing results (a plurality of images corresponding to a plurality of virtual viewpoints) into images for the left eye and those for the right eye and performs conversion processing for each image group into the equirectangular projection. Due to this, the image of the panorama scheme is obtained for the left eye and for the right eye, respectively.

Figure 9E:
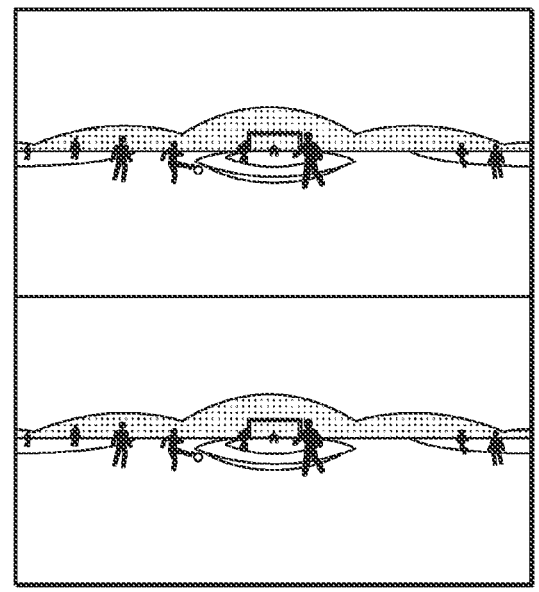

At S835, the main control module 311 performs composition processing by arranging the drawing results at S834 (two images of the panorama scheme with disparity) one on top of another and generates one virtual viewpoint image of the 3D panorama scheme. The format in which two images with both-eye disparity are arranged one on top of another is called the top and bottom format. The virtual viewpoint image of the 3D panorama scheme thus obtained is distributed. FIG. 9E shows the virtual viewpoint image of the 3D panorama scheme corresponding to the virtual camera 210 at the mark 903 described above. In this case also, as in FIG. 9D described previously, the virtual viewpoint image is an image of the entire circumference of 360 degrees with the position 903 within the penalty area being taken as a center and having both-eye disparity. It is possible for a user to view the virtual viewpoint image including the entire circumference of 360 degrees stereoscopically by mounting the headset or the like described previously. Due to this, it is possible for a user to follow the shot scene with a feeling of being as if the user him/herself were within the penalty area only by turning his/her head in the desired direction.

The above is the generation processing of the virtual viewpoint image by each projection scheme. The generation processing of the virtual viewpoint image by each projection scheme described above is an example and the generation processing is not limited to the contents described above. What is required is to be capable of generating the virtual viewpoint image in accordance with each projection scheme, and therefore, it is possible to change the processing order or the image format appropriately.

Modification Example

The processing to generate and distribute a virtual viewpoint image in accordance with the above-described embodiment may be an overload depending on the number of virtual viewpoint images to be generated, the capacity of the multi-viewpoint image and the like. For example, in a case where the multi-viewpoint image whose resolution is high, such as 4K and 8K, is used, the capacity of the multi-viewpoint image becomes large, and therefore, it may become difficult to generate the virtual viewpoint image without a delay with only the one generation server 104 depending on the number of virtual viewpoint image to be generated. In this case, it is no longer possible for the system to function sufficiently, such as that it is no longer possible to output the virtual viewpoint image real time in a simultaneous and parallel manner for a plurality of live distribution requests. In order to deal with the case such as this, it may also be possible to adopt a distributed configuration, for example, such as that shown in FIG. 10. In the system configuration in FIG. 10, a plurality of image generation servers 104*a* to 104*m* and a plurality of database servers 103*a* to 103*m* are prepared in advance and the database server and the image generation server are used among them, which are necessary to deal with the number of virtual viewpoint images to be generated designated in the instruction information.

Figure 10:
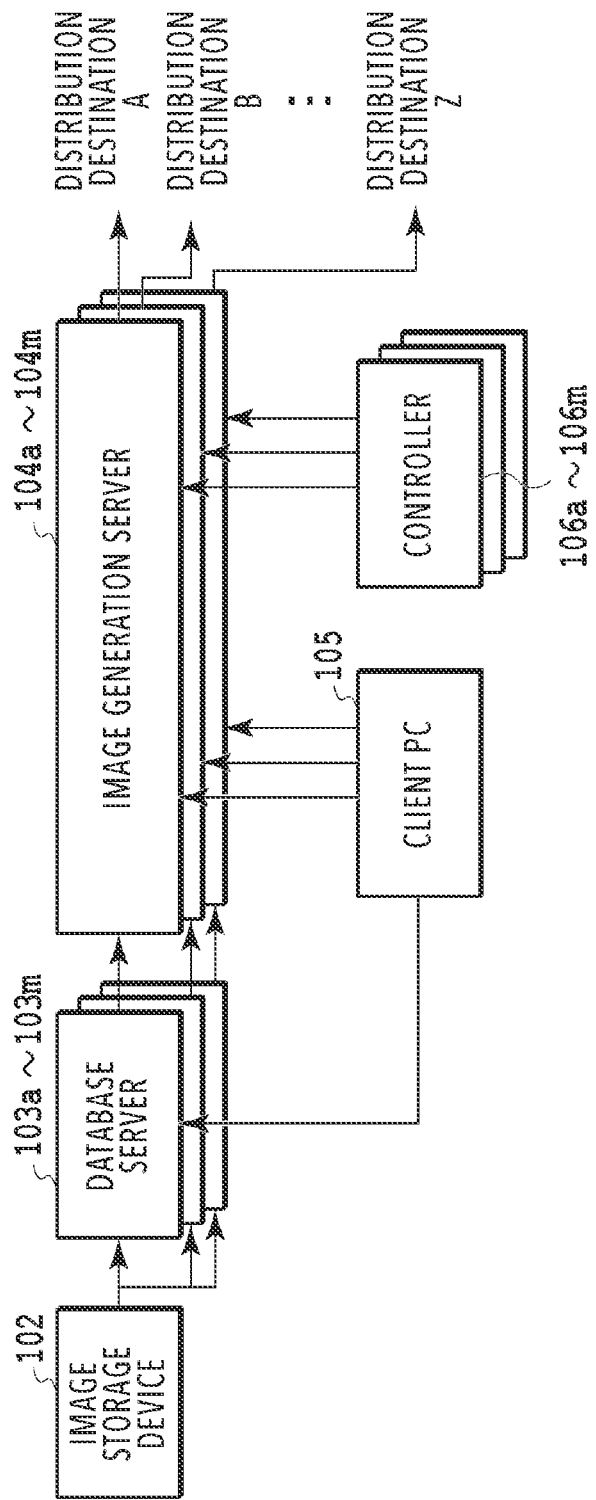
FIG. 10 is a diagram showing an example of a configuration of an image processing system that generates and distributes a virtual viewpoint image.

In the example in FIG. 10, each of the image generation servers 104*a* to 104*m* is connected with each of the database servers 103*a* to 103*m* in a one-to-one manner. Then, by the image storage unit 102, the same multi-viewpoint image is stored in each of the database servers 103*a* to 103*m* and each of the image generation servers 104*a* to 104*m* acquires the multi-viewpoint image, respectively. Then, each of the image generation servers 104*a* to 104*m* generates one virtual viewpoint image in accordance with the instruction information received from the client PC 105 and outputs it to the designated distribution destination. Each of the database servers 103*a* to 103*m* stores the same multi-viewpoint image, and therefore, it may also be possible to configure each of the database servers 103*a* to 103*m* by a cache server. In the example in FIG. 10 also, the configuration is such that the creation of the instruction information to each of the image generation servers 104*a* to 104*m* is performed by the one client PC 105, but a plurality of the client PCs 105 may exist.

Further, it may also be possible to design a configuration in which a dedicated management apparatus that controls the image generation servers 104a to 104m and the database servers 103a to 103m is provided and the management apparatus performs the allocation processing to each of the image generation servers 104a to 104m in place of the determination processing at S711 in the flow in FIG. 7B. For example, it may also be possible to cause a tablet as each of the controllers 106a to 106m to have the function of the management apparatus. It may also be possible for each of the image generation servers 104a to 104m to perform the distribution of the generated virtual viewpoint image or it may also be possible to design a configuration in which the management apparatus performs the distribution processing. It may also be possible for a part of the plurality of the image generation servers 104a to 104m to generate and distribute a plurality of virtual viewpoint images in accordance with the processing load and the like. For example, the management apparatus determines the number of image generation servers to be used based on the format (projection scheme) of the virtual viewpoint image to be generated and distributed or the number of virtual viewpoint images. Then, the management apparatus controls the duplication and output of the multi-viewpoint image by the image storage device 102 so that the same multi-viewpoint image is stored in the database servers corresponding in number to the number of image generation servers to be used. The plurality of virtual viewpoint images generated by the plurality of image generation servers may be output to the distribution destinations different from one another.

In a case of this modification example, even on a condition that the multi-viewpoint image has a high resolution or the like and whose capacity is large, it is possible to flexibly set the number of database servers to be used and the number of image generation servers to be used in accordance with the number of virtual viewpoint images to be generated. By adopting the distributed configuration such as this, it is made possible to deal with a case where a virtual viewpoint image of a high quality is distributed live to a large number of distribution destinations.

As above, according to the present embodiment, it is possible to generate a plurality of virtual viewpoint image whose projection schemes are different from one multi-viewpoint image and output the virtual viewpoint images to different distribution destinations. At that time, the projection scheme can be selected freely. Further, it is possible to set the virtual viewpoint corresponding to each virtual viewpoint image independently. Due to this, it is made possible to generate and distribute a variety of kinds of virtual viewpoint image in a case of being viewed from a variety of viewpoints in the three-dimensional space of an image capturing scene. For example, for a soccer game in a stadium as a target, it is possible to simultaneously distribute an image of the 3D scheme from the virtual viewpoint of the line-of-sight of a player, such as a goal keeper, to a public viewing, such as a movie theater, while distributing an image of the 2D scheme from the virtual viewpoint that follows a ball to the broadcast center of a TV station. Further, it is also possible to simultaneously distribute an image of the panorama scheme and the 3D panorama scheme by which it is possible to view a highlight scene, such as a shot scene, within the penalty area around 360 degrees to a moving image distribution site or SNS. The application target of the present embodiment is not limited to a sports scene and for example, it is possible widely apply the present embodiment to a concert by a famous artist and it is made possible to provide a variety of new viewing experiences using virtual viewpoint images to a user.

According to the present disclosure, it is possible to provide a user with virtual viewpoint contents in a plurality of different formats based on images obtained by performing image capturing with a plurality of imaging devices.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An information processing system comprising:
one or more memories storing instructions; and
one or more processors executing the instructions to:
receive an input for specifying an image format from a plurality of image formats;
obtain viewpoint information for specifying a position of a virtual viewpoint and a view direction from the virtual viewpoint;
obtain a plurality of images based on image capturing by a plurality of imaging devices; and
generate a virtual viewpoint content according to the specified image format based on the plurality of obtained images and the obtained viewpoint information,
wherein, in a case where the specified image format is an image format that requires a plurality of virtual viewpoints,
another virtual viewpoint based on the virtual viewpoint specified by the viewpoint information for the specific image format is complemented, and
a virtual viewpoint image corresponding to the specified virtual viewpoint and an image corresponding to the complemented other virtual viewpoint are generated based on the plurality of obtained images respectively,
the virtual viewpoint content is generated using the virtual viewpoint image corresponding to the specified virtual viewpoint and the image corresponding to the complemented other virtual viewpoint,
wherein in a case where a plurality of image formats is specified and any of the image formats is an image format that requires a plurality of virtual viewpoints,
wherein another virtual viewpoint based on the virtual viewpoint specified by the viewpoint information is generated, and a plurality of virtual viewpoint contents are complemented, each of the plurality of the virtual viewpoint contents corresponding to one of the plurality of image formats,
wherein the other virtual viewpoint is complemented by using an amount of movement and an amount of rotation specified according to the image format beforehand,
wherein the other virtual viewpoint is generated by using an LUT in which a plurality of positions in a three-dimensional space in which the plurality of imaging devices are to perform image capturing and the amount of movement and the amount of rotation which are specified according to the image format beforehand are associated with each other.

2. The information processing system according to claim 1, wherein
two or more virtual viewpoint contents are generated in parallel.

3. The information processing system according to claim 2, wherein
the one or more processors execute the instructions further to:
output each of generated virtual viewpoint contents to different one of output destinations.

4. The information processing system according to claim 1, wherein
virtual viewpoint contents in accordance with a first image format among the plurality of image formats are generated by compositing a first number of images corresponding to a first number of virtual viewpoints different in at least one of a position and a view direction,
virtual viewpoint contents in accordance with a second image format among the plurality of image formats are generated by compositing a second number of images corresponding to a second number of virtual viewpoints different in at least one of a position and a view direction, and
the first number and the second number are different.

5. The information processing system according to claim 1, comprising:
a plurality of image generation apparatuses, wherein
the one or more processors execute the instructions further to:
provide the plurality of obtained images to each of the plurality of image generation apparatuses,
a plurality of virtual viewpoint contents according to the plurality of image formats is generated by the plurality of image generation apparatuses, and
the plurality of image formats are image formats whose numbers of virtual viewpoints used for generation of the virtual viewpoint content are different from one another.

6. The information processing system according to claim 5, wherein the one or more processors execute the instructions further to:
obtain instruction information for specifying a number of the plurality of virtual viewpoint contents to be generated; and
store the plurality of obtained images in each of a plurality of databases in accordance with the number specified by the obtained instruction information, and the plurality of images is provided from the plurality of databases to the plurality of image generation apparatuses.

7. The information processing system according to claim 1, wherein the specific image format is a 3D image format for a stereoscopic view based on both-eye disparity.

8. The information processing system according to claim 1, wherein the specific image format is a 3D panorama image format for stereoscopically viewing a panorama image based on a both-eye disparity.

9. The information processing system according to claim 1, wherein
the specific image format is a panorama image format.

10. The information processing system according to claim 1, wherein
the other virtual viewpoint is complemented by combining movement and rotation of the virtual viewpoint specified by the viewpoint information.

11. The information processing system according to claim 1, wherein
the generated plurality of virtual viewpoint contents correspond to common time code information.

12. The information processing system according to claim 1, wherein
part of viewpoint information used for generation of the plurality of virtual viewpoint contents are common.

13. An information processing method comprising:
receiving an input for specifying an image format from a plurality of image formats;
obtaining viewpoint information for specifying a position of a virtual viewpoint and a view direction from the virtual viewpoint;
obtaining a plurality of images based on image capturing by a plurality of imaging devices; and
generating a plurality of virtual viewpoint content according to the specified image format based on the plurality of obtained images and the obtained viewpoint information,
wherein, in a case where the specified image format is an image format that requires a plurality of virtual viewpoints, another virtual viewpoint based on the virtual viewpoint specified by the viewpoint information for the specific image format is complemented, and
a virtual viewpoint image corresponding to the specified virtual viewpoint and an image corresponding to the complemented other virtual viewpoint are generated based on the plurality of obtained images respectively,
the virtual viewpoint content is generated using the virtual viewpoint image corresponding to the specified virtual viewpoint and the image corresponding to the complemented other virtual viewpoint,
wherein in a case where a plurality of image formats is specified and any of the image formats is an image format that requires a plurality of virtual viewpoints,
wherein another virtual viewpoint based on the virtual viewpoint specified by the viewpoint information is generated, and a plurality of virtual viewpoint contents are complemented, each of the plurality of the virtual viewpoint contents corresponding to one of the plurality of image formats, wherein the other virtual viewpoint is complemented by using an amount of movement and an amount of rotation specified according to the image format beforehand, wherein the other virtual viewpoint is generated by using an LUT in which a plurality of positions in a three-dimensional space in which the plurality of imaging devices are to perform image capturing and the amount of movement and the amount of rotation which are specified according to the image format beforehand are associated with each other.

14. A non-transitory computer readable storage medium storing a program for causing a computer to function as an information processing system comprising:

one or more memories storing instructions:
one or more processors executing the instructions to:
receive an input for specifying an image format from a plurality of image formats;
obtain viewpoint information for specifying a position of a virtual viewpoint and a view direction from the virtual viewpoint;
obtain a plurality of images based on image capturing by a plurality of imaging devices; and
generate a plurality of virtual viewpoint content according to the specified image format based on the plurality of obtained images and the obtained viewpoint information,
wherein, in a case where the specified image format is an image format that requires a plurality of virtual viewpoints, another virtual viewpoint based on the virtual viewpoint specified by the viewpoint information for the specific image format is complemented, and
a virtual viewpoint image corresponding to the specified virtual viewpoint and an image corresponding to the complemented other virtual viewpoint are generated based on the plurality of obtained images respectively,
the virtual viewpoint content is generated using the virtual viewpoint image corresponding to the specified virtual viewpoint and the image corresponding to the complemented other virtual viewpoint,
wherein in a case where a plurality of image formats is specified and any of the image formats is an image format that requires a plurality of virtual viewpoints,
wherein another virtual viewpoint based on the virtual viewpoint specified by the viewpoint information is generated, and a plurality of virtual viewpoint contents are complemented, each of the plurality of the virtual viewpoint contents corresponding to one of the plurality of image formats,
wherein the other virtual viewpoint is complemented by using an amount of movement and an amount of rotation specified according to the image format beforehand,
wherein the other virtual viewpoint is generated by using an LUT in which a plurality of positions in a three-dimensional space in which the plurality of imaging devices are to perform image capturing and the amount of movement and the amount of rotation which are specified according to the image format beforehand are associated with each other.

* * * * *